United States Patent
Bae et al.

(10) Patent No.: US 7,321,602 B2
(45) Date of Patent: Jan. 22, 2008

(54) APPARATUS AND METHOD FOR INSERTING NULL PACKET IN DIGITAL BROADCASTING TRANSMISSION SYSTEM

(75) Inventors: Byungjun Bae, Daejeon (KR); Joonyoung Choi, Daejeon (KR); Jinhwan Lee, Daejeon (KR); Youngkwon Hahm, Daejeon (KR); Chieteuk Ahn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 993 days.

(21) Appl. No.: 10/407,571

(22) Filed: Apr. 4, 2003

(65) Prior Publication Data

US 2004/0008736 A1 Jan. 15, 2004

(30) Foreign Application Priority Data

Oct. 7, 2002 (KR) ...................... 10-2002-0060991

(51) Int. Cl.
*H04J 3/12* (2006.01)
(52) U.S. Cl. ...................... 370/528; 386/111; 725/135
(58) Field of Classification Search ................. 370/540
See application file for complete search history.

(56) References Cited

U.S. PATENT DOCUMENTS

| | | | |
|---|---|---|---|
| 6,169,843 B1 * | 1/2001 | Lenihan et al. ............... 386/46 |
| 6,233,253 B1 * | 5/2001 | Settle et al. ................. 370/474 |
| 6,233,255 B1 * | 5/2001 | Kato et al. .................. 370/486 |
| 6,414,970 B1 * | 7/2002 | Negishi et al. ............. 370/510 |
| 6,421,359 B1 * | 7/2002 | Bennett et al. ............. 370/538 |
| 6,556,588 B2 * | 4/2003 | Wan et al. .................. 370/474 |
| 6,661,808 B2 * | 12/2003 | Kato et al. .................. 370/486 |
| 6,721,957 B1 * | 4/2004 | Lawrence ................... 725/114 |
| 6,763,025 B2 * | 7/2004 | Leatherbury et al. .. 370/395.64 |
| 6,771,657 B1 * | 8/2004 | Elstermann ................. 370/465 |
| 6,993,081 B1 * | 1/2006 | Brunheroto et al. ... 375/240.28 |
| 7,058,815 B2 * | 6/2006 | Morin ......................... 713/180 |
| 7,065,782 B2 * | 6/2006 | Shimoji et al. ............. 725/135 |
| 7,096,481 B1 * | 8/2006 | Forecast et al. .............. 725/32 |
| 7,173,947 B1 * | 2/2007 | Ramakrishnan et al. .... 370/537 |
| 2002/0146023 A1 * | 10/2002 | Myers ......................... 370/412 |
| 2005/0265700 A1 * | 12/2005 | Kato ........................... 386/111 |

\* cited by examiner

*Primary Examiner*—Chi Pham
*Assistant Examiner*—Kevin Mew
(74) *Attorney, Agent, or Firm*—Blakely, Sokoloff, Taylor & Zafman (57) ABSTRACT

A null packet insertion apparatus including a null packet remover for removing an irregularly inserted null packet from an externally received video/audio transport stream; a null packet bit rate calculator for calculating a bit rate of the removed null packet; a GUI for determining the transmission period of a periodic null packet to be newly inserted, based on the calculated bit rate, by an external user; a periodic null packet generator; a multiplexer for regularly inserting the periodic null packet preferentially and inserting the video/audio transport stream with the irregular null packet removed, and performing multiplexing; a non-periodic null packet generator; and a PCR corrector.

8 Claims, 5 Drawing Sheets

APPARATUS AND METHOD FOR INSERTING NULL PACKET IN DIGITAL BROADCASTING TRANSMISSION SYSTEM

BACKGROUND OF THE INVENTION (a) Field of the Invention

The present invention relates to an apparatus and method for inserting a null packet. More specifically, the present invention relates to an apparatus and method for inserting a null packet in a digital broadcasting transmission system that periodically inserts a null packet into a video/audio transport stream (TS) and transmits the inserted null packet.

(b) Description of the Related Art

As the use of digital audio has been extended in various applications, such as communications, computers, electric home appliances and so forth, there have been problems related to storage and transmission of a large amount of data.

To solve these problems, the MPEG (Motion Picture Experts Group)-1 standard was formed in 1991 under the supervision of the International Standardization Organization (ISO), and it was expanded for multi-channels to establish the MPEG-2 international standard in November, 1994. MPEG-2 was developed to have broader applications and high-quality pictures, and it is now expected to be used in many fields of industry, including broadcasting, electric home appliances, and communication.

In digital broadcasting transmission systems based on the MPEG-2 algorithm, transmission rates differ from system to system, and the rates are determined from the bit rates of video/audio/data broadcasting signals and null packets.

According to the MPEG-2 international standard, the null packet (i.e., a packet transferred to maintain a constant transmission rate, without effective data) is irregularly inserted solely in consideration of the MPEG-2 decoding buffer model, and it is discarded without use in the decoding step.

More specifically, the null packet has been conventionally used solely for the purpose of maintaining a constant data transmission rate. Namely, in multiplexing video, audio, and data signals, the sum of the bit rates of the signals is compared with the transmission rate, and the null packet is inserted by as much as the deficit.

In the null packet insertion method, the null packet is inconsistently inserted solely in consideration of the MPEG-2 decoding buffer model, as a result of which it is difficult to detect the position of the null packet in the received video/audio transport stream, and worse, it is impossible to use the null packet as an information packet.

Accordingly, there is a demand for an apparatus and method for null packet insertion that regularly inserts a null packet into a video/audio transport stream to be transferred, and uses the inserted null packet to enhance the performance of the digital broadcasting transmission/reception system.

SUMMARY OF THE INVENTION

It is an object of the present invention to solve the problems with the prior art, and to provide an apparatus and method for null packet insertion in a digital broadcasting transmission system that regularly inserts a null packet into a video/audio transport stream (TS), and uses the inserted null packet as an information packet to enhance the performance of the digital broadcasting transmission/reception system.

It is another object of the present invention to provide an apparatus and method for null packet insertion in a digital broadcasting transmission system that inserts periodic and non-periodic null packets into a video/audio transport stream to maintain the data input rate of the digital broadcasting transmission system to be equal to the data output rate.

It is further another object of the present invention to provide an apparatus and method for null packet insertion in a digital broadcasting transmission system that regularly inserts a robust stream into a video/audio transport stream, thereby enhancing the reception performance of a DTV.

In one aspect of the present invention, there is provided a method for inserting a null packet in a digital broadcasting transmission system that includes: (a) removing an irregularly inserted null packet from an externally received video/audio transport stream; (b) calculating a bit rate of the removed null packet and determining the transmission period of a periodic null packet to be inserted in a range not exceeding the calculated bit rate of the null packet; (c) generating a periodic null packet according to the determined transmission period; (d) regularly inserting the periodic null packet preferentially and then inserting the video/audio transport stream with the irregular null packet removed, and performing multiplexing; (e) generating a non-periodic null packet and inserting the generated non-periodic null packet, when an output rate of the multiplexed transport stream is not equal to an input rate of the externally received video/audio transport stream; and (f) correcting a changed PCR (Program Clock Reference) value of the multiplexed transport stream and outputting the corrected PCR value.

In another aspect of the present invention, there is provided a method for inserting a null packet in a digital broadcasting transmission system that includes: (a) removing an irregularly inserted null packet from an externally received video/audio transport stream; (b) calculating a bit rate of the removed null packet and determining the transmission period of a periodic robust stream to be inserted in a range not exceeding the calculated bit rate of the null packet;

(c) generating a periodic robust stream according to the determined transmission period; (d) regularly inserting the periodic robust stream preferentially and inserting the video/audio transport stream with the irregular null packet removed, and performing multiplexing; (e) generating a non-periodic null packet and inserting the generated non-periodic null packet, when an output rate of the multiplexed transport stream is not equal to an input rate of the externally received video/audio transport stream; and (f) correcting a changed PCR value of the multiplexed transport stream and outputting the corrected PCR value.

In further another aspect of the present invention, there is provided an apparatus for inserting a null packet in a digital broadcasting transmission system that includes: a null packet remover for removing an irregularly inserted null packet from an externally received video/audio transport stream; a null packet bit rate calculator for calculating a bit rate of the removed null packet; a GUI (Graphic User Interface) for determining the transmission period of a periodic robust stream to be newly inserted, based on the calculated bit rate, by an external user; a periodic null packet generator for generating a periodic null packet according to the determined transmission period; a multiplexer for regularly inserting the periodic null packet preferentially and then inserting the video/audio transport stream with the irregular null packet removed, and performing multiplexing; a non-periodic null packet generator for generating a non-periodic null packet and inserting the generated non-periodic null packet, when an output rate of the multiplexed transport stream is not equal to an input rate of the externally received video/audio transport stream; and a PCR corrector for correcting a changed PCR value of the multiplexed transport stream and outputting the corrected PCR value.

In still further another aspect of the present invention, there is provided an apparatus for inserting a null packet in a digital broadcasting transmission system that includes: a null packet remover for removing an irregularly inserted null packet from an externally received video/audio transport stream; a null packet bit rate calculator for calculating a bit rate of the removed null packet; a GUI for determining the transmission period of a periodic null packet to be newly inserted, based on the calculated bit rate, by an external user; a periodic robust stream generator for generating a periodic robust stream according to the determined transmission period; a multiplexer for regularly inserting the periodic robust stream preferentially and then inserting the video/audio transport stream with the irregular null packet removed, and performing multiplexing; a non-periodic null packet generator for generating a non-periodic null packet and inserting the generated non-periodic null packet, when an output rate of the multiplexed transport stream is not equal to an input rate of the externally received video/audio transport stream; and a PCR corrector for correcting a changed PCR value of the multiplexed transport stream and outputting the corrected PCR value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
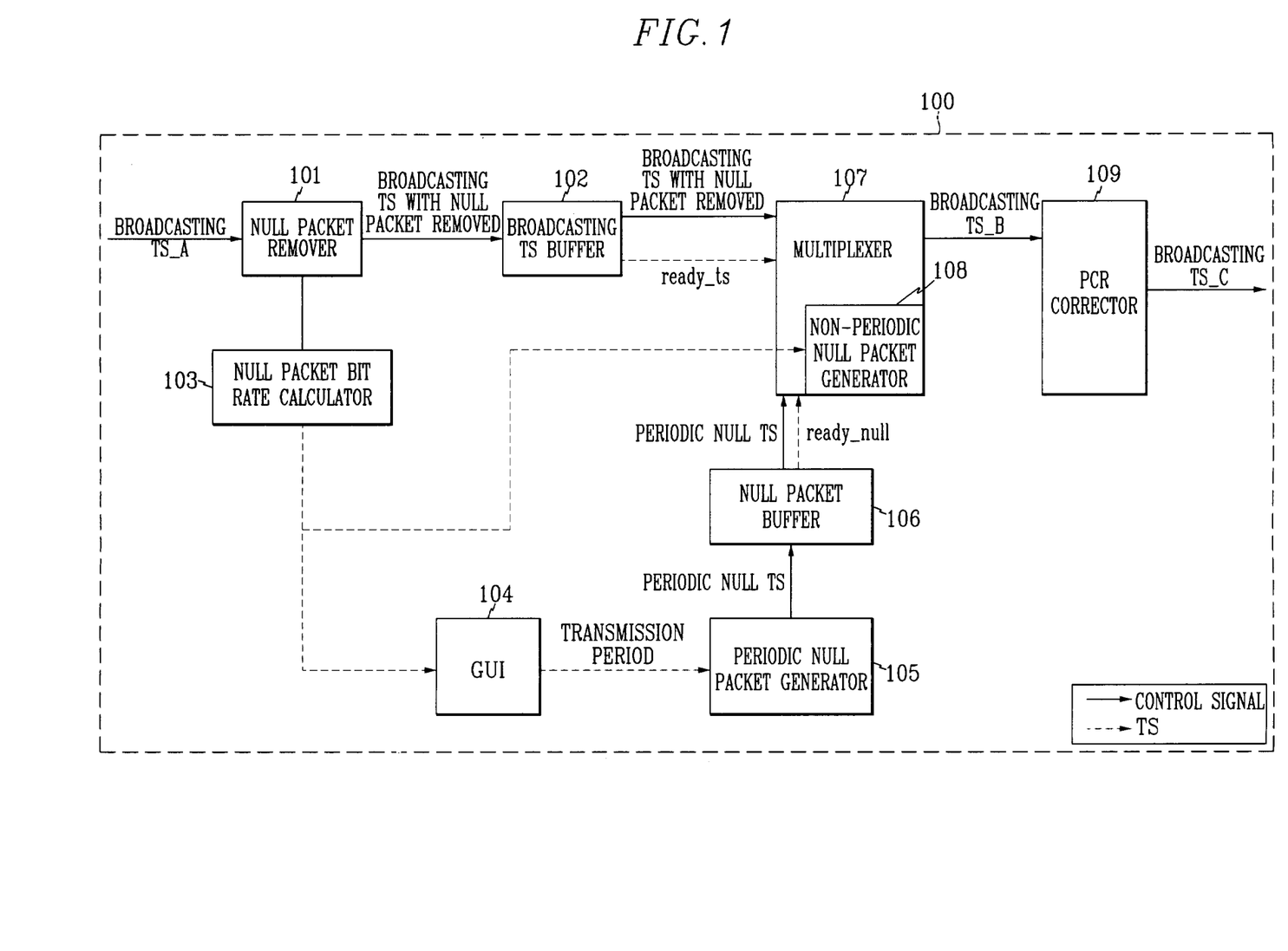
FIG. 1 is a detailed block diagram of a null packet insertion apparatus in a digital broadcasting transmission system according to a first embodiment of the present invention.

FIG. 1 is a detailed block diagram of a null packet insertion apparatus in a digital broadcasting transmission system according to a first embodiment of to the present invention.

The null packet insertion apparatus 100 in a digital broadcasting transmission system according to the first embodiment of the present invention comprises, as shown in FIG. 1, a null packet remover 101, a broadcasting TS buffer 102, a null packet bit rate calculator 103, a GUI (Graphic User Interface) 104, a periodic null packet generator 105, a null packet buffer 106, a multiplexer 107, a non-periodic null packet generator 108, and a PCR corrector 109.

More specifically, upon receiving a video/audio transport stream (TS) encoded according to the MPEG (Motion Picture Experts Group)-2 standards from an exterior component (e.g., an encoder or a memory in the digital broadcasting transmission system), the null packet remover 101 removes null packets from the received MPEG-2 video/audio TS.

The removed null packet is an irregularly inserted packet for maintaining a constant transmission rate (i.e., input/output rate) of digital data to be transferred to the reception system. The null packet has a PID (Packet Identifier) of 0×1FFF at the head, and the PID is detected before removal of the null packet.

The broadcasting TS buffer 102 stores the MPEG-2 video/audio TS from the null packet remover 101 in the units of a 188-byte packet, and outputs a corresponding flag signal ready-ts when the stored video/audio TS exceeds at least one packet.

The null packet bit rate calculator 103 calculates the total bit rate of the null packets removed by the null packet remover 101. The calculated null packet bit rate is used as reference data for maintaining the data output rate of the digital broadcasting transmission system to be equal to the data input rate.

The GUI 104 determines the transmission period of a null packet to be periodically inserted into the MPEG-2 video/audio TS, through an external user. The external user determines the transmission period in consideration of the null packet bit rate calculated by the null packet bit rate calculator 103.

The total bit rate of the removed null packets is taken into consideration in determining the transmission period of the null packet to be periodically inserted in order to maintain the output rate of the final digital data to be equal to the input rate in the digital broadcasting transmission system. For this purpose, the user determines the transmission period of the null packet to be periodically inserted, in a range not exceeding the bit rate of the removed null packet.

The periodic null packet generator 105 generates a null packet to be inserted into the MPEG-2 video/audio TS, according to the transmission period determined by the GUI 104.

The null packet buffer 106 temporarily stores the null packet, generated according to a predetermined transmission period, in the units of a 188-byte packet, and outputs a corresponding flag signal ready_null when the stored null packet exceeds at least one packet.

Upon receiving the flag signal ready_ts or ready_null from the broadcasting TS buffer 102 or the null packet buffer 106, the multiplexer 107 receives the MPEG-2 video/audio TS and the periodic null packet from the broadcasting TS buffer 102 and the null packet buffer 106, respectively, and performs multiplexing.

In the multiplexing process, the multiplexer 107 according to the first embodiment of the present invention multiplexes the related data according to their priority. Namely, the multiplexer 107 preferentially inserts the periodic null packet at predetermined time intervals and then inserts the MPEG-2 video/audio TS.

Inserting the periodic null packet at predetermined time intervals in multiplexing the MPEG-2 video/audio TS and the periodic null packet is aimed at allowing the digital broadcasting reception system to readily detect the insertion position of the null packet and use the null packet to enhance the reception performance through an efficient application (e.g., error detection).

If neither the flag signal ready_ts nor the flag signal ready_null is received from the broadcasting TS buffer 102 and the null packet buffer 106, respectively, the non-periodic null packet generator 108 generates a non-periodic null packet for maintaining the data output rate of the digital broadcasting transmission system to be equal to the data input rate.

Namely, the multiplexing process according to the first embodiment of the present invention is performed on the corresponding data in the order of periodic null packet, MPEG-2 video/audio TS, and non-periodic null packet.

The PCR corrector 109 compensates for a variation of the PCR (Program Clock Reference) value generated in the multiplexing process to prevent problems (e.g., generation of an error caused by reproduction of overlapping programs) caused in the decoding process.

Next, a description will be given as to an operation of the null packet insertion apparatus in a digital broadcasting transmission system with reference to the accompanying drawings.

Figure 2:
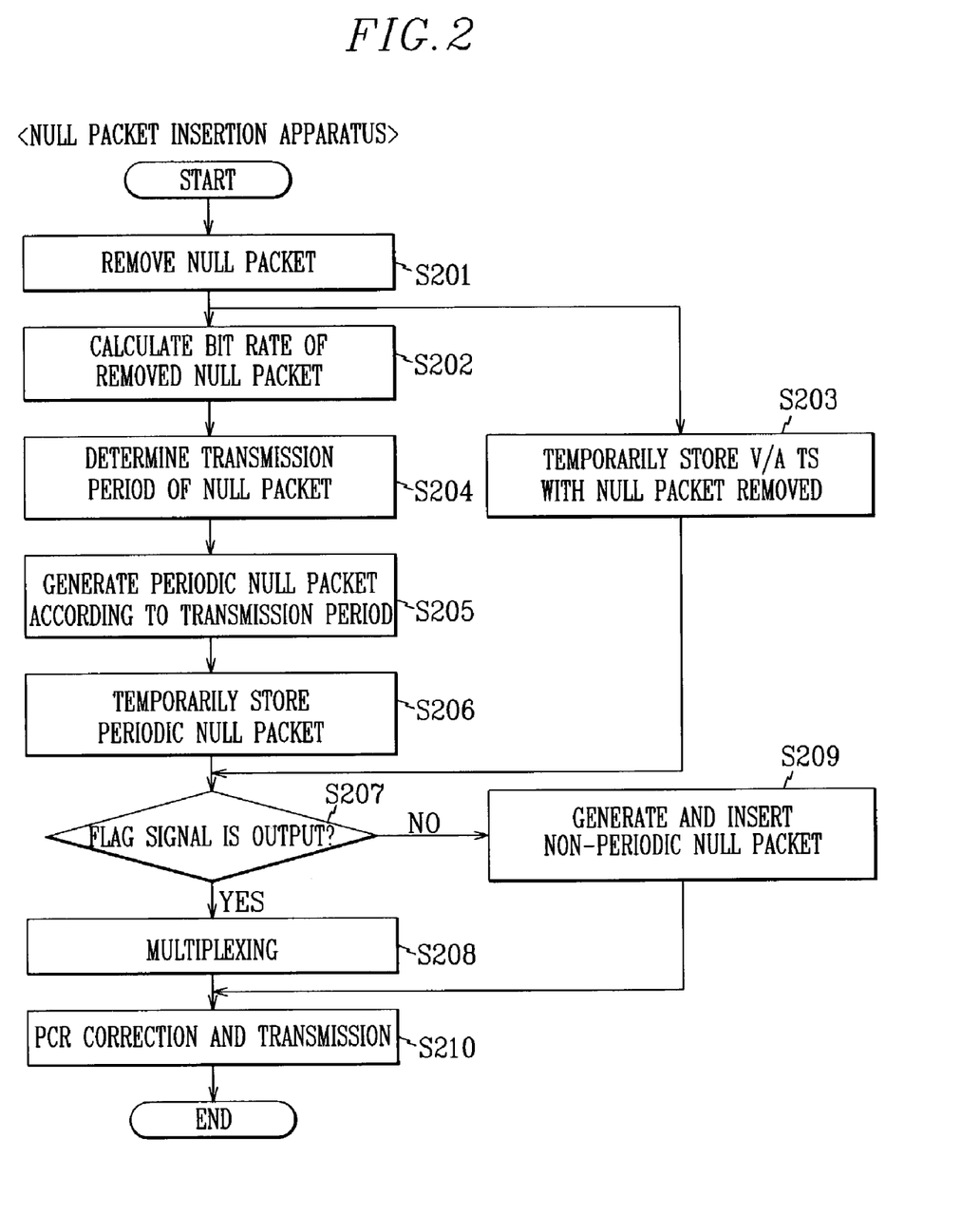
FIG. 2 is a flow chart showing an operation of the null packet insertion apparatus in a digital broadcasting transmission system according to the first embodiment of the present invention.

FIG. 2 is a flow chart showing an operation of the null packet insertion apparatus in a digital broadcasting transmission system according to the first embodiment of the present invention.

Upon externally receiving a video/audio TS encoded according to the MPEG-2 standard, as illustrated in FIG. 2, the null packet remover 101 detects null packets from the input MPEG-2 video/audio TS and removes the detected null packets, in step 201.

The null packet bit rate calculator 103 calculates the total bit rate of the null packets removed by the null packet remover 101, in step 202. The broadcasting TS buffer 102 temporarily stores the MPEG-2 video/audio TS, with the null packet removed, in the units of a 188-byte packet, in step 203. The broadcasting TS buffer 102 outputs the corresponding flag signal ready_ts when the stored video/audio TS exceeds at least one packet.

The GUI 104 determines the transmission period of a null packet to be periodically inserted into the MPEG-2 video/audio TS through an external user, in step 204. The user determines the transmission period of the null packet in a range not exceeding the total bit rate of the removed null packet.

Subsequently, the periodic null packet generator 105 generates a null packet, to be periodically inserted, according to the transmission period determined by the GUI 104, in step 205.

The null packet buffer 106 temporarily stores the periodic null packet in the units of a 188-byte packet, in step 206, and outputs a corresponding flag signal ready_null when the stored periodic null packet exceeds at least one packet, then the null packet buffer 106.

The multiplexer 107 checks whether or not the flag signal ready_null or ready_ts is output from the null packet buffer 106 or the broadcasting TS buffer 102, in step 207.

More specifically, upon receiving the flag signal ready_null from the null packet buffer 106, the multiplexer according to the first embodiment of the present invention receives the periodic null packet temporarily stored in the null packet buffer 106 and regularly inserts it.

Upon receiving the flag signal ready_ts from the broadcasting TS buffer 102, the multiplexer 107 receives the video/audio TS temporarily stored in the broadcasting TS buffer 102 and inserts it at a position other than at the null packet inserted position.

Namely, the multiplexer 107 according to the first embodiment of the present invention multiplexes the corresponding data with a priority on the periodic null packet, in step 208. An illustration of this operation is presented in FIG. 3.

Figure 3:
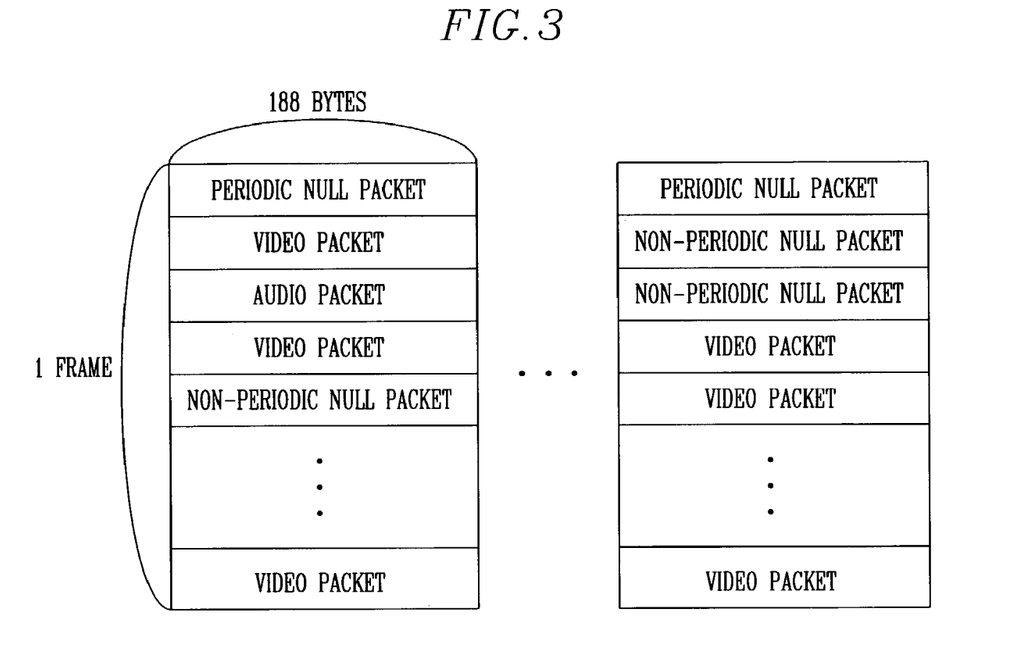
FIG. 3 illustrates an example of transport streams each having a different construction according to the first embodiment of the present invention.

FIG. 3 illustrates an example of TS's each having a different construction according to the first embodiment of the present invention.

As shown in FIG. 3, the periodic null packet in each TS constituting one frame is inserted at a fixed position, i.e., regularly disposed, and video, audio, or non-periodic packets are inserted at the other positions.

Namely, the multiplexer 107 according to the first embodiment of the present invention multiplexes the corresponding data with a priority on the periodic null packet so as to regularly insert the null packet into the corresponding TS and use the inserted null packet as an information packet to enhance the system performance.

If neither the flag signal ready_null nor ready_ts is received from the null packet buffer 106 or the broadcasting TS buffer 102, then the multiplexer 107 controls the non-periodic null packet generator 108 to generate a non-periodic null packet and insert the generated non-periodic null packet. This is for maintaining a constant data transmission rate, i.e., a data input/output rate.

Namely, the non-periodic null packet generator 108 generates a non-periodic null packet and inserts the generated null packet, upon receiving a signal representing the output of the flag signal ready_null or ready_ts from the multiplexer 107, in step 209.

The PCR corrector 109 compensates for the variation of the PCR value generated in the multiplexing process and sends the corresponding TS to the digital broadcasting reception system, in step 210.

Next, a second embodiment of the null packet insertion apparatus having the above features will be described with reference to the accompanying drawings.

Figure 4:
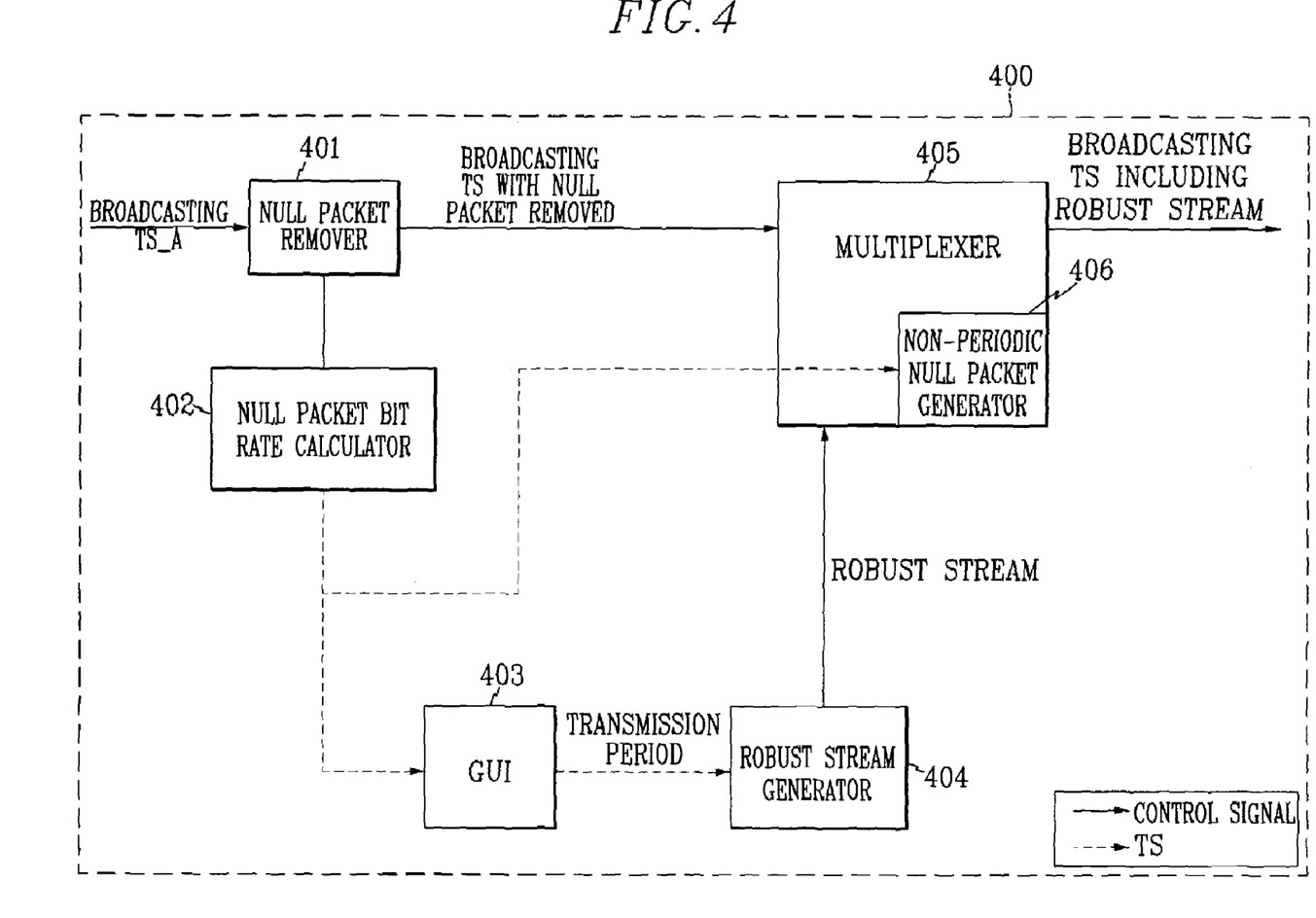
FIG. 4 illustrates a detailed construction of the null packet insertion apparatus in a digital broadcasting transmission system according to a second embodiment of the present invention.

FIG. 4 illustrates a detailed construction of the null packet insertion apparatus in a digital broadcasting transmission system according to another embodiment of the present invention.

Compared with the first embodiment, the null packet insertion apparatus according to the second embodiment of the present invention includes a robust stream generator 405, as illustrated in FIG. 4. Namely, the null packet insertion apparatus according to the second embodiment of the present invention regularly inserts a robust stream for enhancing the DTV (Desk Top Video) reception performance instead of the periodic null packet into the TS, and uses the inserted robust stream as an information packet.

For simplicity, the null packet insertion apparatus 400 according to the second embodiment of the present invention comprises a null packet remover 401, a null packet bit rate calculator 402, a GUI 403, a robust stream generator 404, a multiplexer 405, and a non-periodic null packet generator 406.

First, upon receiving a video/audio transport stream (TS) encoded according to the MPEG-2 standard from an exterior component, the null packet remover 401 removes a null packet from the received MPEG-2 video/audio TS.

The null packet bit rate calculator 402 calculates the total bit rate of the null packet removed by the null packet remover 401. The calculated null packet bit rate is used as reference data for maintaining the data output rate of the digital broadcasting transmission system to be equal to the data input rate.

The GUI 403 determines the transmission period of a robust stream to be periodically inserted into the MPEG-2 video/audio TS periodically through an external user. The external user determines the transmission period in consideration of the null packet bit rate calculated by the null packet bit rate calculator 402. Namely, the transmission period is determined in a range not exceeding the bit rate of the removed null packet.

The robust stream generator 404 generates a robust stream to be regularly inserted into the MPEG-2 video/audio TS according to the transmission period determined by the GUI 403.

The multiplexer 405 receives the MPEG-2 video/audio TS and the periodic robust stream from the null packet remover 401 and the robust stream generator 404, respectively, and performs multiplexing.

In the multiplexing process, the multiplexer 405 according to the embodiment of the present invention multiplexes the related data according to their priority, as stated above. Namely, the multiplexer 405 preferentially inserts the periodic robust stream at predetermined time intervals and then inserts the MPEG-2 video/audio TS.

Inserting the periodic robust stream at predetermined time intervals in multiplexing the MPEG-2 video/audio TS and the periodic robust stream is aimed at allowing the digital broadcasting reception system to readily detect the insertion position of the robust stream and use the robust stream to enhance the reception performance through an efficient application (e.g., error detection). Namely, in the second embodiment of the present invention, the periodic robust stream rather than the periodic null packet is generated and regularly inserted.

The non-periodic null packet generator 406 generates a non-periodic null packet and inserts the generated non-periodic null packet, under the control of the multiplexer 405, so as to maintain the data output rate of the digital broadcasting transmission system to be equal to the input rate.

Namely, the multiplexer 405 according to the embodiment of the present invention multiplexes the corresponding data in the order of periodic robust stream, MPEG-2 video/audio TS, and non-periodic null packet.

Next, a description will be given as to an operation of the above-constructed null packet insertion apparatus with reference to the accompanying drawings.

Figure 5:
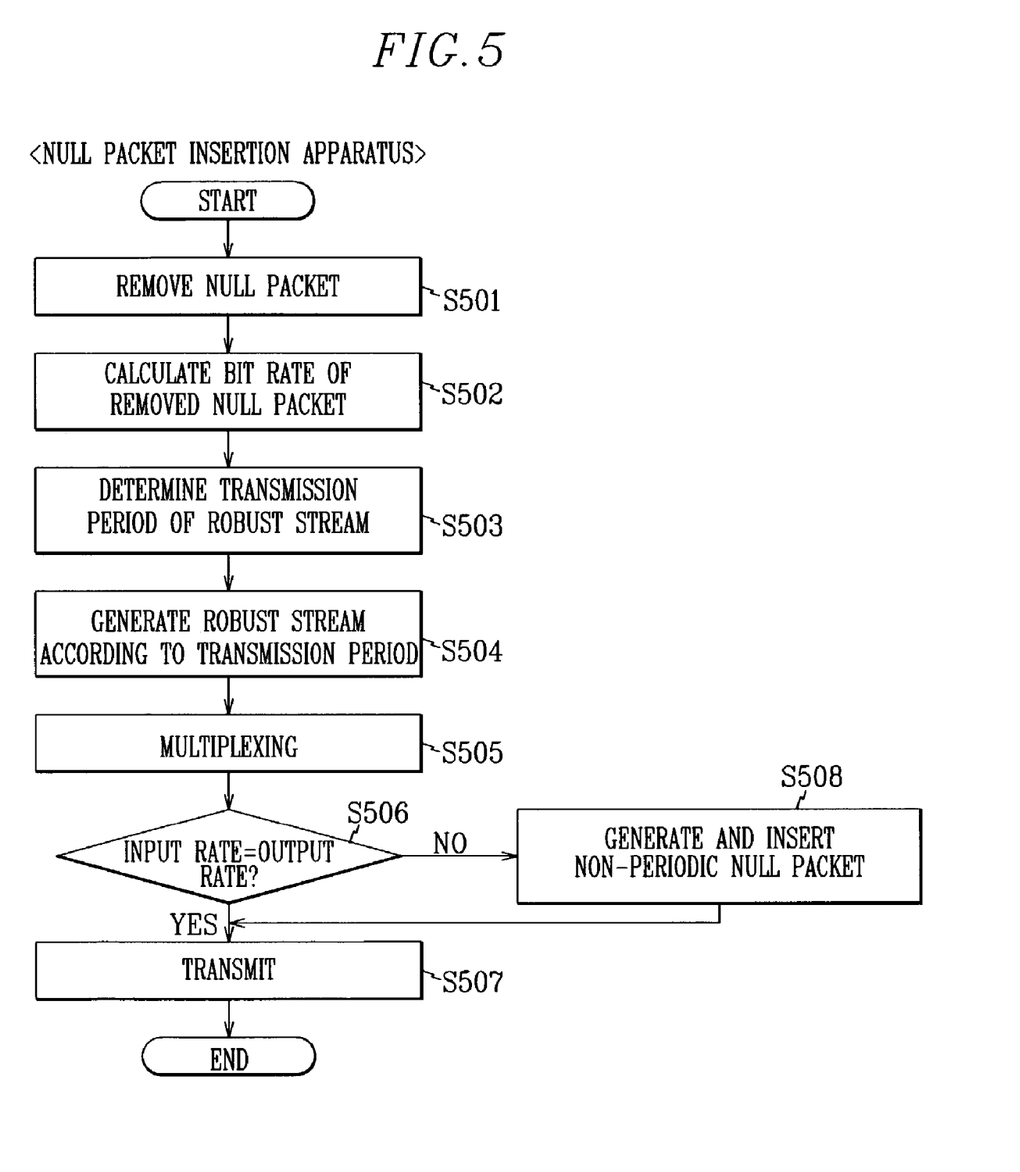
FIG. 5 is a flow chart showing an operation of the null packet insertion apparatus shown in FIG. 4.

FIG. 5 is a flow chart showing an operation of the null packet insertion apparatus according to the second embodiment of the present invention.

Upon externally receiving a video/audio TS encoded according to the MPEG-2 standard, as illustrated in FIG. 5, the null packet remover 401 detects null packets from the input MPEG-2 video/audio TS and removes the detected null packets, in step 501.

The null packet bit rate calculator 402 calculates the total bit rate of the null packets removed by the null packet remover 401, in step 502. The GUI 403 determines the transmission period of a robust stream to be periodically inserted into the MPEG-2 video/audio TS through an external user, in step 503. Here, the user determines the transmission period in a range not exceeding the total bit rate of the removed null packets.

The robust stream generator 404 generates a robust stream to be regularly inserted, according to the transmission period determined by the GUI 403, in step 504.

The multiplexer 405 multiplexes the video/audio TS and the periodic robust stream received from the null packet remover 401 and the robust stream generator 404, respectively, in step 505. In the multiplexing process, the multiplexer 405 multiplexes the corresponding data in the order of periodic robust stream, video/audio TS, and non-periodic null packet.

Subsequently, the multiplexer 405 checks whether or not the transmission rate of the multiplexed TS is equal to that of an externally received video/audio TS. If the multiplexed TS is not equal in transmission rate to the externally received video/audio TS, then the non-periodic null packet from the non-periodic null packet generator is inserted, in step 508, and externally output. Otherwise, if the multiplexed TS is equal in transmission rate to the externally input video/audio TS, then the multiplexed video/audio TS is sent to the digital broadcasting reception system, in step 507.

As described above, the null packet insertion apparatus in a digital broadcasting transmission system according to the embodiment of the present invention inserts a null packet or a robust stream for maintaining a constant transmission rate at predetermined time intervals and uses the inserted null packet or robust stream as an information packet, thereby enhancing the performance of the digital broadcasting transmission/reception system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The apparatus and method for inserting a null packet in a digital broadcasting transmission system regularly inserts a null packet for maintaining a constant data transmission rate into a corresponding transport stream and using the inserted null packet as an information packet, thus enhancing the performance of the transmission/reception system. In addition, the null packet insertion apparatus and method regularly inserts a robust stream into a video/audio transport stream and transmits the inserted robust stream to enhance the DTV reception performance.

What is claimed is:

1. A method for inserting a null packet in a digital broadcasting transmission system, the method comprising:
(a) removing an irregularly inserted null packet from an externally received video/audio transport stream;
(b) calculating a bit rate of the removed null packet and determining the transmission period of a periodic null packet to be newly inserted in a range not exceeding the calculated bit rate of the null packet;
(c) generating a periodic null packet according to the determined transmission period;
(d) regularly inserting the periodic null packet preferentially and then inserting the video/audio transport stream with the irregular null packet removed, and performing multiplexing;
(e) generating a non-periodic null packet and inserting the generated non-periodic null packet, when an output rate of the multiplexed transport stream is not equal to an input rate of the externally received video/audio transport stream;

(f) correcting a changed PCR (Program Clock Reference) value of the multiplexed transport stream and outputting the corrected PCR value;

(g) temporarily storing the video/audio transport stream, with the irregular null packet removed, in the units of a packet of a predetermined size, and outputting a stream flag signal when the stored video/audio transport stream exceeds at least one packet; and (h) temporarily storing the generated periodic null packet in the units of a packet of a predetermined size, and outputting a packet flag signal when the stored null packet exceeds at least one packet.

2. The method as claimed in claim 1, wherein the step (d) comprises:

inserting the generated periodic null packet at predetermined time intervals, when the packet flag signal is output; and inserting the video/audio transport stream, with the irregular null packet removed, at a position other than the insertion position of the periodic null packet, when the stream flag signal is output.

3. The method as claimed in claim 2, wherein the step (e) comprises:

inserting the non-periodic null packet at a position other than the insertion position of the video/audio transport stream with the irregular null packet removed, when neither the packet flag signal nor the stream flag signal is output.

4. The method as claimed in claim 1, wherein the externally received video/audio transport stream is encoded according to the MPEG (Motion Picture Experts Group)-2 standard.

5. An apparatus for inserting a null packet in a digital broadcasting transmission system, the apparatus comprising:

a null packet remover for removing an irregularly inserted null packet from an externally received video/audio transport stream;

a null packet bit rate calculator for calculating a bit rate of the removed null packet;

a GUI (Graphic User Interface) for determining the transmission period of a periodic null packet to be newly inserted, based on the calculated bit rate, by an external user;

a periodic null packet generator for generating a periodic null packet according to the determined transmission period;

a multiplexer for regularly inserting the periodic null packet preferentially and then inserting the video/audio transport stream with the irregular null packet removed, and performing multiplexing;

a non-periodic null packet generator for generating a non-periodic null packet and inserting the generated non-periodic null packet, when an output rate of the multiplexed transport stream is not equal to an input rate of the externally received video/audio transport stream;

a PCR corrector for correcting a changed PCR value of the multiplexed transport stream and outputting the corrected PCR value;

a broadcasting TS buffer for temporarily storing the video/audio transport stream, with the irregular null packet removed, in the units of a packet of a predetermined size, and outputting a stream flag signal when the stored video/audio transport stream exceeds at least one packet; and a null packet buffer for temporarily storing the generated periodic null packet in the units of a packet of a predetermined size, and outputting a packet flag signal when the stored null packet exceeds at least one packet.

6. The apparatus as claimed claim 5, wherein the multiplexer inserts the generated periodic null packet preferentially, and then inserts the video/audio transport stream with the irregular null, packet removed at a position other than the insertion position of the periodic null packet, upon receiving the packet flag signal and the stream flag signal from the null packet buffer and the broadcasting TS buffer, respectively.

7. The apparatus as claimed in claim 6, wherein the multiplexer inserts the non-periodic null packet at a position other than the insertion position of the video/audio transport stream with the irregular null packet removed, upon receiving neither the packet flag signal nor the stream flag signal from the null packet buffer and the broadcasting TS buffer.

8. The apparatus as claimed in claim 5, wherein the GUI determines the transmission period of the periodic null packet in a range not exceeding the bit rate of the removed null packet.

* * * * *